Nov. 29, 1955  C. L. MERSHON  2,725,452
REGULATORS
Filed March 26, 1953
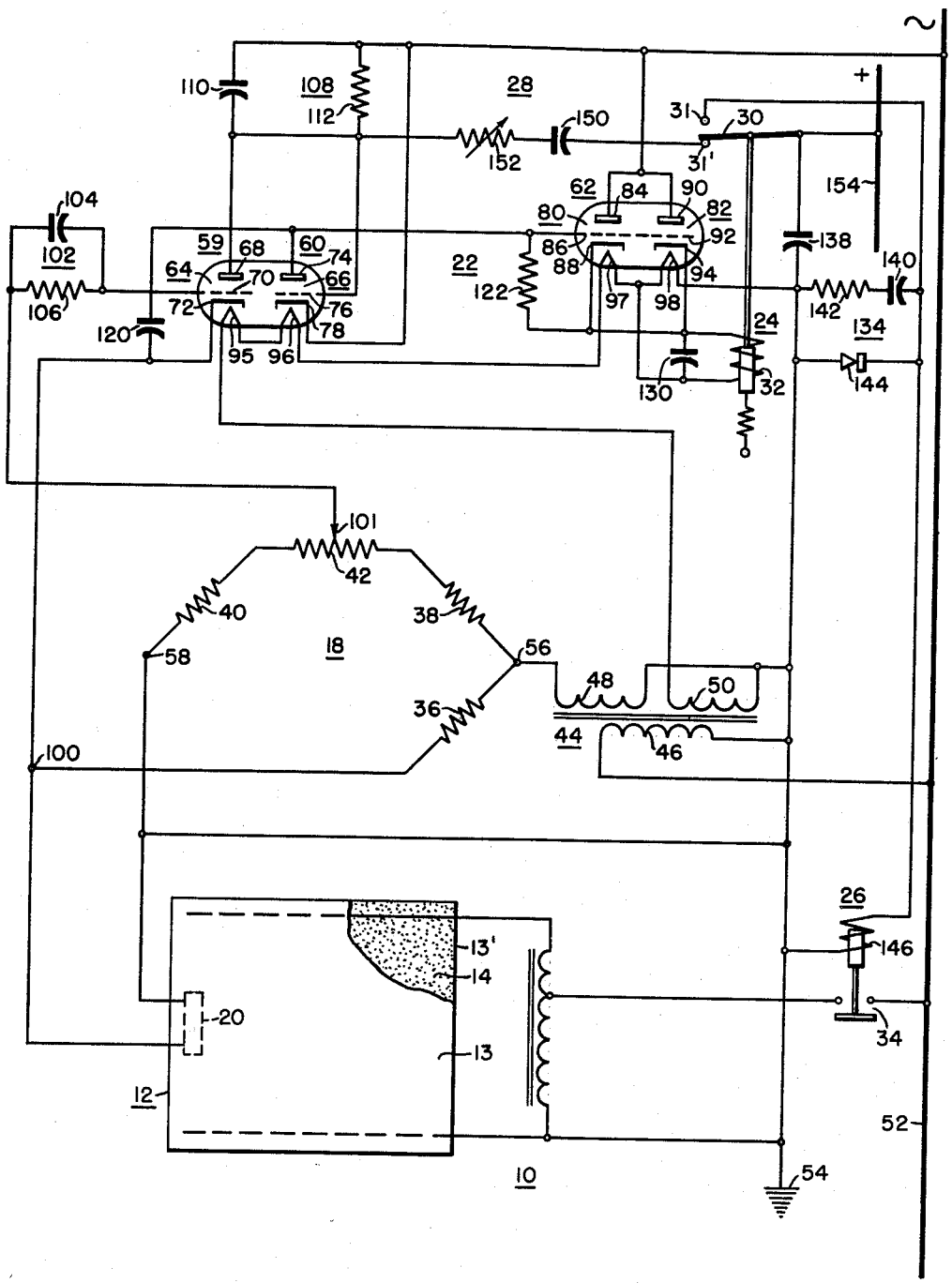
WITNESSES:
Robert C Baird
K. W. Thomas
INVENTOR
Clarence L. Mershon.
BY
Ezra D Savage
ATTORNEY United States Patent Office 2,725,452
Patented Nov. 29, 1955

2,725,452

REGULATORS

Clarence L. Mershon, Lima, Ohio, assignor to Westinghouse Electric Corporation, East Pittsburgh, Pa., a corporation of Pennsylvania Application March 26, 1953, Serial No. 344,850

7 Claims. (Cl. 219—20)

This invention relates to regulator systems and more particularly to means for preventing chattering of the contacts of a control relay incorporated in the regulator system.

In order to properly de-ice the windows of, for instance, an airplane, it is necessary to maintain the temperature of these windows substantially constant by means of a regulator system. It is desirable that such a regulator system be sensitive and yet effect a minimum of wear on the contacts of the control relays incorporated therein.

In the past it has been found that a highly sensitive regulator system is obtained by controlling the action of a sensitive control relay with a sensitive electronic control system. However, even though such a regulator system is sensitive, there is a considerable amount of chattering of the contacts of the control relay, which chattering greatly decreases the life of these contacts and renders the regulator system unstable. Since there is only a small amount of power output from the electronic control circuit for operating the sensitive relay, the sensitive control relay must be a type such as the single-pole double-throw contact type. Therefore, this precludes the use of a conventional electrical detent for preventing chattering between the relay contacts because such a conventional detent circuit would require an auxiliary contact on the control relay to shunt out, upon closing, a resistance in the operating coil circuit of the control relay to thereby allow more current to flow in the operating coil circuit when the main contacts of the control relay are in the closed position.

A broad object of this invention is to provide a temperature regulator system which is highly sensitive and yet effects a minimum of wear on the contacts of a control relay incorporated therein.

Another object of this invention is to provide for preventing chattering and thus the wearing of the contacts of a sensitive control relay incorporated in a sensitive temperature regulator system, by so inter-connecting the control relay with amplifier means disposed to supply energy to the control relay that the output of the amplifier means changes in response to the operation of the control relay to thereby increase or decrease the current flow through the operating coil of the control relay in accordance with such operation to thereby prevent chattering and thus wearing of the contacts of the control relay.

A further object of this invention is to provide for preventing the chattering and thus wearing of the contacts of a sensitive control relay, which is responsive to the output of an electronic tube and is incorporated in a sensitive electronic temperature regulator system, by changing the bias on the control electrode of the electronic tube in response to the operation of the control relay to thereby increase or decrease the current flow through the operating coil of the control relay in accordance with such operation to thus prevent chattering of the relay contacts.

A still further object of this invention is to provide for obtaining the desired spread for a control relay, incorporated in a sensitive electronic temperature regulator system, without impairing the sensitivity of the regulator system, by so inter-connecting a variable resistor between the control relay and the control electrode of an electronic tube which controls the magnitude of the current flow through the operating coil of the control relay, that the variable resistor is capable of changing the bias on the control electrode to thus change the spread of the control relay to the desired value to thereby prevent wearing of the contacts of the control relay.

Other objects of this invention will become apparent from the following description when taken in conjunction with the accompanying drawing, the single figure of which is a schematic diagram illustrating circuits and apparatus embodying the teachings of this invention.

Referring to the drawing there is illustrated a temperature regulator system 10 for maintaining the temperature of a window 12 substantially constant. The window 12, in this instance, comprises two layers of glass 13 and 13', the layer 13' having an electrically conducting coating 14 applied thereto which functions as a resistor heating element.

In general, the regulator system 10 comprises a Wheatstone bridge circuit 18 having a temperature sensitive element 20 disposed in juxtaposition to the window 12, the temperature sensitive element 20 being responsive to temperature changes in the window 12 to effect a change in the relation of the ohmic resistance of the members of the bridge circuit 18, amplifying means 22 responsive to such a change in the resistance relation of the bridge circuit 18, a sensitive control relay 24 having two spaced stationary contacts 31 and 31', a movable contact 30 for selectively engaging the contacts 31 and 31' and an operating coil 32 responsive to the output of the amplifying means 22, a direct-current line contactor 26 responsive to the positioning of the control relay 24 for connecting the heating element 14 of the window 12 to a suitable source of alternating-current power, and a detent circuit 28 connected between the amplifier means 22 and the control relay 24 for changing the output of the amplifying means 22 in response to the operation of the control relay 24, that is in accordance with whether the movable contact 30 is in engagement with or out of engagement with the stationary contact 31', to thereby increase or decrease the current flow through the operating coil 32 of the relay 24 in accordance with such operation of the control relay 24, to thus prevent chattering of the contacts 30, 31, and 31' of the control relay 24 or chattering of the contacts 34 of the line contactor 26.

Referring more particularly to the bridge circuit 18, it can be seen that the temperature sensitive element 20 comprises one leg of the bridge circuit. The other legs or members of the bridge circuit 18 consist of the resistors 36, 38 and 40 and the variable resistor 42, the function of which will be described hereinafter. In order to provide an alternating-current input to the bridge circuit 18 a potential transformer 44, having a primary winding 46 and a secondary winding comprising two sections 48 and 50, is provided. In particular, one end of the primary winding 46 is connected to an alternating-current bus 52 and the other end of the primary winding 46 is connected to a ground point 54 which constitutes the other side of the source of alternating-current power. On the other hand, the secondary winding section 48 of the transformer 44 is connected to the input terminals 56 and 58 of the bridge circuit 18.

As hereinbefore mentioned, the amplifying means 22 is responsive to the unbalance of the bridge circuit 18. Specifically, the amplifying means 22 comprises three stages of amplification 59, 60 and 62. The first stage of amplification 59 includes the triode 64 having an anode 68, a control electrode 70 and a cathode 72. The second stage of amplification 60 comprises the triode 66 having an anode 74, a control electrode 76 and a cathode 78. On the other hand, the third stage of amplification 62 includes two triodes 80 and 82, the triode 80 having an anode 84, a control electrode 86, and a cathode 88 and the triode 82 having an anode 90, a control electrode 92 and a cathode 94. As illustrated, the triodes 64, 66, 80 and 82 are provided with heater filaments 95, 96, 97 and 98, respectively. In order to supply energy to the heater filaments 95, 96, 97 and 98, these heater filaments are connected in series circuit relationship with one another, the series circuit being connected across the secondary winding section 50 of the transformer 44.

In order to render the amplifying means 22, and more specifically the triode 64 of the first stage of amplification 60, responsive to the unbalance of the bridge circuit 18, one of the output terminals 100 of the bridge circuit 18 is connected to the cathode 72 of the triode 64 while the other output terminal, as represented by a slidable contact 101 on the variable resistor 42, is connected to the control electrode 70 of the triode 64 through a grid leak 102 comprising a capacitor 104 and a resistor 106.

For the purpose of biasing the control electrode 76 of the triode 66 in accordance with the magnitude of the current flow through the triode 64 and thus in accordance with the unbalance of the bridge circuit 18, a grid leak 108 comprising a capacitor 110 and a resistor 112 is provided. On the other hand, the bias for the control electrodes 86 and 92 of the third stage of amplification 62 is determined by the magnitude of the current flow through the triode 66 of the second stage of amplification 60 and more specifically by the magnitude of the electrical charge on a capacitor 120, which capacitor is connected in circuit with the triode 66 so that current simultaneously flows through the triode 66 and the capacitor 120. In this instance a grid resistor 122 is provided for the triodes 80 and 82 which are connected in parallel in order to obtain a higher amplification factor.

As hereinbefore mentioned the control relay 24 is responsive to the output of the amplifying means 22. Specifically, the operating coil 32 of the control relay 24 is responsive to the output of the triodes 80 and 82 of the third stage of amplification 62. As illustrated, the control relay 24 includes a capacitor 130 which is connected in parallel circuit relationship with the operating coil 32 in order to smooth out the voltage appearing across the operating coil. In practice, the stationary contact 31 constitutes the normally open contact and the stationary contact 31' constitutes the normally closed contact of the relay 24.

In order to render the contactor 26 responsive to the operation of the control relay 24 direct-current circuit means including an arc suppression network 134 is connected between the control relay 24 and the contactor 26. As illustrated, the arc suppression network 134 comprises capacitors 138 and 140, a resistor 142 and a dry-type rectifier 144. The reason the arc suppression network 134 is provided is to by-pass direct current received from the operating coil 146 of the contactor 26 and thereby prevent arcing between the movable contact 30 and the normally open contact 31. Such current received from the operating coil 146 is brought about by a decay in the flux in the operating coil 146 when the movable contact 30 of the relay 24 moves from the normally open contact 31 to the normally closed contact 31'.

In accordance with the teachings of this invention the detent circuit 28 prevents the chattering of the contacts 30, 31 and 31' of the relay 24 and thus the chattering of the contacts 34 of the contactor 26, to thereby increase the life of these contacts. As illustrated, the detent circuit 28 comprises a capacitor 150 and a variable resistor 152. The capacitor 150 and the variable resistor 152 are connected in series circuit relationship with one another, one end of the series circuit being connected to the control electrode 76 of the triode 66 and the other end of the series circuit being connected to the normally closed contact 31' of the control relay 24. The function of the capacitor 150 is to prevent the flow of direct current from a direct-current bus 154 through the contacts 30 and 31', the capacitor 150, the resistor 152, the triode 64 of the first stage of amplification 59, and the temperature sensitive element 20, to the ground point 54 which also acts as a ground point for the direct-current energy. Such a current flow if variable in magnitude would decrease the sensitivity of the regulator system 10. However, it is to be understood that if the resistor 152 is properly constructed and the direct-current voltage between the ground point 54 and the direct-current bus 154 is maintained substantially constant it is not necessary to provide the capacitor 150.

By providing the variable resistor 152 and interconnecting it with the remainder of the circuit, as illustrated in the drawing, the desired spread can be obtained for the control relay 24 without impairing the sensitivity of the regulator system 10. If one was not able to obtain this desired spread for the relay 24 its contacts 30, 31 and 31' would chatter to thus greatly decrease the life of these contacts. Thus by providing the detent circuit 28 chattering of the contacts 30, 31 and 31' of the relay 24 and chattering of the contacts 34 of the contactor 26 is prevented and yet owing to the combination of the high gain amplifying means 22 and the sensitive control relay 24, the regulator system 10 has high sensitivity. The manner in which the detent circuit 28 cooperates with the remainder of the regulator system 10 to perform these desirable functions will be described hereinafter.

Before putting the regulator system 10 into operation certain adjustments must be made. For instance, the variable resistor 42 of the bridge circuit 18 must be adjusted so as to obtain a proper unbalance of the bridge circuit 18 when the temperature of the window 12 is at its regulated value. Further, the variable resistor 152, incorporated in the detent circuit 28, must be adjusted in order to provide the desired spread for the control relay 24.

The operation of the regulator system will now be described. When the temperature of the window 12 is at its regulated value the bridge circuit 18 is unbalanced in a given direction. Assuming the temperature of the window 12 decreases to a value below its regulated value, so as to decrease the temperature of the temperature sensitive element 20. With a decrease in the temperature of the temperature sensitive element 20, the bridge circuit 18 assumes a more balanced condition to thereby effect a decrease in the negative bias on the control electrode 70 of the triode 64 to thus increase the current flow through the triode 64. The electrical path for this current flow through the triode 64 extends from the alternating-current bus 52 through the capacitor 110, the triode 64, and the temperature sensitive element 20 to the ground point 54.

The triodes 64 and 66 are so connected to the bus 52 and to the ground point 54, that the triodes 64 and 66 alternately conduct current, that is they are 180° out of phase. The magnitude of the conductivity of the triode 66 is determined by the magnitude of the current flow through the triode 64 and the capacitor 110. The reason for this is that the magnitude of the current flow through the capacitor 110 during the conductivity of the triode 64 determines the amount of current flow through the resistor 112 as effected by the discharge of the capacitor 110, which discharge occurs after the triode 64 stops conducting and the triode 66 starts conducting. Thus, the amount of charge on the capacitor 110 determines the magnitude of the negative bias applied to the control electrode 76 of the triode 66. Therefore, with an increase in the current flow through the triode 64, resulting from a decrease in the temperature of the window 12 below its regulated value, the capacitor 110 effects an increase in the negative bias on the control electrode 76 of the triode 66 to thereby decrease the conductivity of the triode 66, the conducting path of which extends from the ground point 54 through the temperature sensitive element 20, the capacitor 120, and the triode 66 to the alternating-current bus 52.

With a decrease in the current flow through the capacitor 120, which determines the negative bias applied to the control electrodes 86 and 92 of the triodes 80 and 82, respectively, the conductivity of the triodes 80 and 82 increases to thus increase the magnitude of the current flow through the operating coil 32 whose energizing circuit extends from the alternating-current bus 52 through the triodes 80 and 82, the operating coil 32 of the relay 24, and the filament 98 of the triode 82, to the ground point 54. An increase in the current flow through the operating coil 32 effects an actuation of the movable contact 30 into engagement with the normally open contact 31, to thereby complete a direct-current energizing circuit to the operating coil 146 of the contactor 26 which extends from the direct-current bus 154 through the contacts 30 and 31 of the relay 24, and the operating coil 146, to the ground point 54. On completion of an energizing circuit to the operation coil 146, the contacts 34 of the contactor 26 are actuated to the closed position to thereby electrically connect the heating element 14 of the window 12 to the source of alternating-current power as applied to the bus 52 and the ground point 54 and thus return the temperature of the window 12 to its regulated value.

It is to be noted that when the movable contact 30 disengages the normally closed contact 31', the detent circuit 28 effects an increase in the current flow through the operating coil 32 of the control relay 24 to thereby prevent chattering of the contacts 30, 31 and 31' of the relay 24. The reason the detent circuit 28 is able to effect such an increase in the current flow through the operating coil 32 can be understood by considering that when the movable contact 30 disengages the normally closed contact 31' the negative bias on the control electrode 76 of the triode 66 increases in response to such operation of the relay 24, to thereby decrease the conductivity of the triode 66. A decrease in the conductivity of the triode 66 decreases the negative potential on the control electrodes 86 and 92 of the triodes 80 and 82, respectively, to thereby increase the conductivity of the triodes 80 and 82 and thus increase the current flow through the operating coil 32 of the control relay 24.

On the other hand with an increase in the temperature of the window 12 above its regulated value, the bridge circuit 18 unbalances further to thereby increase the negative bias applied to the control electrode 70 of the triode 64. With an increase in the negative bias applied to the control electrode 70 the conductivity of the triode 64 decreases to thereby decrease the negative bias applied to the control electrode 76 of the triode 66. A decrease in the negative bias applied to the control electrode 76 in turn effects an increase in the conductivity of the triode 66 to thus increase the negative bias applied to the control electrodes 86 and 92 of the triodes 80 and 82, respectively. Such an action decreases the conductivity of the triodes 80 and 82 to thereby decrease the current flow through the operating coil 32. With a decrease in the current flow through the operating coil 32 the movable contact 30 is actuated into engagement with the normally closed contact 31' to thereby deenergize the operating coil 146 of the contactor 26 and thus decrease the temperature of the window 12 until it returns to its regulated value.

When the movable contact 30 engages the normally closed contact 31' the detent circuit 28 again effects a change in the magnitute of the negative bias applied to the control electrode 76 of the triode 66. In particular, when the movable contact 30 engages the contact 31' the detent circuit 28 effects a decrease in the negative bias as applied to the control electrode 76 of the triode 66. A decrease in the negative bias applied to the control electrode 76 increases the conductivity of the triode 66 to thereby increase the negative bias as applied to the control electrodes 86 and 92 of the triodes 80 and 82, respectively. With an increase in the negative bias applied to the control electrodes 86 and 92 the conductivity of the triodes 80 and 82 is decreased to thereby decrease the magnitude of the current flow through the operating coil 32. Such a decrease in the current flow through the operating coil 32 as affected by the detent circuit 28 again prevents chattering of the contacts 30, 31 and 31' of the relay 24.

It is to be understood that although triodes 64, 66, 80 and 82 are utilized for the stages of amplification 59, 60 and 62, other suitable electronic tubes having at least three electrodes could be utilized.

The apparatus embodying the teachings of this invention has several advantages. For instance, the regulator system 10 is both sensitive and stable. Chattering of the contacts of the control relay 24 and thus chattering of the contacts of the contactor 26 is prevented by the detent circuit 28. Therefore, the life of the contacts of the control relay 24 and the contactor 26 is greatly increased. Further, the high sensitivity of the regulator system 10 allows more force to be applied to the movable contact 30 of the relay 24 to break the movable contact 30 away from either of the spaced contacts 31 or 31' should the movable contact 30 be sticking to either of the spaced contacts 31 or 31'. The reason such a large force is applied to the movable contact 30 of the relay 24 is that owing to the high sensitivity of the regulator system 10 a large change in the current flow through the operating coil 32 of the relay 24 occurs for a given change in the temperature of the window 12.

Since numerous changes may be made in the above described apparatus and circuits, and different embodiments of the invention may be made without departing from the spirit and scope thereof, it is to be understood that all the matter contained in the foregoing description or shown in the accompanying drawings shall be interpreted as illustrative and not in a limiting sense.

I claim as my invention:

1. In a regulator system for controlling the temperature of a window having a heating element associated therewith, the heating element being disposed to be connected to a source of power, in combination, a contactor for connecting the heating element to the source of power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, amplifying means responsive to such change in the resistance relation between the members of the bridge circuit, a control relay having an operating coil, two spaced stationary contacts, and a movable contact for selectively engaging the two spaced stationary contacts, said operating coil being responsive to the output of the amplifying means, other circuit means connected to said contactor and to the control relay so that when said movable cotnact is actuated into engagement with one of the two spaced stationary contacts said contactor becomes energized to thereby connect the heating element to said source of power, and further circuit means connected between the amplifying means and the other contact of the two spaced stationary contacts for changing the output of the amplifying means in response to the operation of the control relay, to thereby control the magnitude of the current flow through the operating coil of the control relay in accordance with such operation of the control relay to thus prevent chattering of said contacts of the control relay.

2. In a regulator system for controlling the temperature of a window having a heating element associated therewith, the heating element being disposed to be connected to a source of power, in combination, a contactor for connecting the heating eleement to the source of power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for applying a voltage between the anode and the cathode of the electronic tube, a control relay having an operating coil, two spaced stationary contacts, and a movable contact for selectively engaging the two spaced stationary contacts, said operating coil being responsive to the output of the electronic tube, other circuit means connected to said contactor and to the control relay so that when said movable contact is actuated into engagement with one of the two spaced stationary contacts said contactor becomes energized to thereby connect the heating element to said source of power, and further circuit means connected between the control electrode of the electronic tube and the other contact of the two spaced stationary contacts for changing the bias on the control electrode of the electronic tube in response to the operation of the control relay, to thereby control the magnitude of the current flow through said operating coil in accordance with such operation of the control relay to thus prevent chattering of said contacts of the control relay.

3. In a regulator system for controlling the temperature of a window having a heating element associated therewith, the heating element being disposed to be connected to a source of power, in combination, a contactor for connecting the heating element to the source of power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for applying a voltage between the anode and the cathode of the electronic tube, a control relay having an operating coil, two spaced stationary contacts, and a movable contact for selectively engaging the two spaced stationary contacts, said operating coil being responsive to the output of the electronic tube, other circuit means connected to said contactor and to the control relay so that when said movable contact is actuated into engagement with one of the two spaced stationary contacts said contactor becomes energized to thereby connect the heating element to said source of power, and further circuit means connected between the control electrode of the electronic tube and the other contact of the two spaced stationary contacts for changing the bias on the control electrode of the electronic tube in response to the operation of the control relay, to thereby control the magnitude of the current flow through said operating coil in accordance with such operation of the control relay to thus prevent chattering of said contacts of the control relay, said further circuit means including a variable resistor for varying the spread of the control relay.

4. In a regulator system for controlling the temperature of a window having a heating element associated therewith, the heating element being disposed to be connected to a source of alternating-current power, in combination, a direct-current contactor for connecting the heating element to the source of alternating-current power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for connecting the anode and cathode to the source of alternating-current power, a control relay having an operating coil, two spaced stationary contacts, and a movable contact for selectively engaging the two spaced stationary contacts, said operating coil being responsive to the output of the electronic tube, direct-current circuit means connected to the direct-current contactor and to the control relay so that when said movable contact is in engagement with one of the two spaced stationary contacts said contactor becomes energized to thereby connect the heating element to said source of alternating-current power, and further circuit means connected between the control electrode of the electronic tube and the other contact of the two spaced stationary contacts for changing the bias on said control electrode in response to the operation of the control relay, to thereby control the magnitude of the current flow through said operating coil in accordance with such operation of the control relay to thus prevent chattering of said contacts of the control relay, said further circuit means including a capacitor for preventing the flow of direct current from the direct-current circuit means to the control electrode of the electronic tube.

5. In a regulator system for controlling the temperature of a window having a heating element associated therewith, the heating element being disposed to be connected to a source of alternating-current power, in combination, a direct-current contactor for connecting the heating element to the source of alternating-current power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for connecting the anode and cathode to the source of alternating-current power, a control relay having an operating coil, two spaced stationary contacts, and a movable contact for selectively engaging the two spaced stationary contacts, said operating coil being responsive to the output of the electronic tube, direct-current circuit means connected to the direct-current contactor and to the control relay so that when said movable contact is in engagement with one of the two spaced stationary contacts said contactor becomes energized to thereby connect the heating element to said source of alternating-current power, and further circuit means connected between the control electrode of the electronic tube and the other contact of the two spaced stationary contacts for changing the bias on said control electrode in response to the operation of the control relay, to thereby control the magnitude of the current flow through said operating coil in accordance with such operation of the control relay to thus prevent chattering of said contacts of the control relay, said further circuit means including a variable resistor for varying the spread of the control relay.

6. In a regulator system for controlling the temperature of a window having a heating element associated therewith, the heating element being disposed to be connected to a source of alternating-current power, in combination, a direct-current contactor for connecting the heating element to the source of alternating-current power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for connecting the anode and cathode to the source of alternating-current power, a control relay having an operating coil, two spaced stationary contacts, and a movable contact for selectively engaging the two spaced stationary contacts, said operating coil being responsive to the output of the electronic tube, direct-current circuit means connected to the direct-current contactor and to the control relay so that when said movable contact is in engagement with one of the two spaced stationary contacts said contactor becomes energized to thereby connect the heating element to said source of alternating-current power, and further circuit means connected between the control electrode of the electronic tube and the other contact of the two spaced stationary contacts for changing the bias on said control electrode in response to the operation of the control relay to thereby control the magnitude of the current flow through said operating coil in accordance with such operation of the control relay to thus prevent chattering of said contacts of the control relay, said further circuit means including a capacitor for preventing the flow of direct current from the direct-current circuit means to the control electrode of the electronic tube and a variable resistor for varying the spread of the control relay.

7. In a regulator system for controlling the temperature of a window having a heating element associated therewith, the heating element being disposed to be connected to a source of alternating-current power, in combination, a direct-current contactor for connecting the heating element to the source of alternating-current power, a bridge circuit comprising a plurality of members, one of the members being a temperature sensitive element disposed in juxtaposition to the window, the temperature sensitive element being responsive to temperature changes in the window to effect a change in the relation of the ohmic resistance of the members of the bridge circuit, an electronic tube having at least an anode, a control electrode, and a cathode, the bias on the control electrode being determined by such change in the resistance relation between the members of the bridge circuit, circuit means for connecting the anode and cathode to the source of alternating-current power, an electronic amplifier connected to amplify the output of said electronic tube, a control relay having an operating coil, two spaced stationary contacts and a movable contact for selectively engaging the two spaced stationary contacts, said operating coil being responsive to the output of said electronic amplifier, direct-current circuit means connected to the direct-current contactor and to the control relay so that when said movable contact is in engagement with one of the two spaced stationary contacts said contactor becomes energized to thereby connect the heating element to said source of alternating-current power, and further circuit means connected between the control electrode of the electronic tube and the other contact of the two spaced stationary contacts for changing the bias on said control electrode in response to the operation of the control relay, to thereby control the magnitude of the current flow through said operating coil in accordance with such operation of the control relay to thus prevent chattering of said contacts of the control relay, said further circuit means including a capacitor for preventing the flow of direct current from the direct-current circuit means to the control electrode of the electronic tube and a variable resistor for varying the spread of the control relay.

References Cited in the file of this patent

UNITED STATES PATENTS

| | | |
|---|---|---|
| 2,488,422 | Mershon | Nov. 15, 1949 |
| 2,488,580 | Burleigh, Jr. | Nov. 22, 1949 |
| 2,519,109 | Callender | Aug. 15, 1950 |
| 2,522,753 | Drobisch | Sept. 19, 1950 |
| 2,522,826 | Hooven | Sept. 19, 1950 |
| 2,680,186 | Pridmore et al. | June 1, 1954 |
| 2,707,275 | Loft | Apr. 26, 1955 |